United States Patent
Sankrithi

(10) Patent No.: US 8,864,079 B2
(45) Date of Patent: Oct. 21, 2014

(54) AIRCRAFT CARGO COMPARTMENT CONTAINER CRANE SYSTEM

(71) Applicant: The Boeing Company, Chicago, IL (US)

(72) Inventor: Mithra M. K. V. Sankrithi, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/646,900

(22) Filed: Oct. 8, 2012

(65) Prior Publication Data

US 2014/0097296 A1    Apr. 10, 2014

(51) Int. Cl.
*B64C 1/22*      (2006.01)

(52) U.S. Cl.
USPC .................. 244/137.1; 244/118.1; 212/74

(58) Field of Classification Search
USPC ............... 244/1 R, 118.1, 129.1, 137.1
See application file for complete search history.

(56) References Cited

U.S. PATENT DOCUMENTS

| | | | |
|---|---|---|---|
| 1,341,996 A | 6/1920 | Plucienski | |
| 2,095,440 A | 10/1937 | Hojnowski | |
| 2,268,009 A | 12/1941 | Babb et al. | |
| 2,367,538 A | 1/1945 | Sullivan | |
| 2,404,195 A | 7/1946 | Schlieben | |
| 2,441,367 A | 5/1948 | Noville | |
| 2,529,908 A * | 11/1950 | Bortner et al. | 244/137.1 |
| 3,028,130 A | 4/1962 | Burton | |
| 3,051,419 A | 8/1962 | Weiland et al. | |
| 3,102,607 A | 9/1963 | Roberts | |
| 3,463,334 A * | 8/1969 | Longmire et al. | 244/137.1 |
| 3,520,502 A * | 7/1970 | Smethers, Jr. | 244/137.1 |
| 3,552,587 A * | 1/1971 | Warren | 244/137.1 |
| 3,700,128 A * | 10/1972 | Noble et al. | 414/231 |
| 3,776,492 A * | 12/1973 | Iben | 244/137.1 |
| 3,999,630 A | 12/1976 | McPhee | |
| 4,805,852 A * | 2/1989 | Nordstrom | 244/137.1 |
| 4,858,855 A | 8/1989 | Dalbera | |
| 4,989,809 A * | 2/1991 | Arnold | 244/137.1 |
| 5,014,935 A * | 5/1991 | Dalbera | 244/137.1 |
| 5,088,661 A * | 2/1992 | Whitener | 244/76 R |
| 5,205,515 A | 4/1993 | Luria | |
| 5,763,811 A * | 6/1998 | Ruzicka | 89/1.51 |
| 6,340,136 B1 | 1/2002 | Luria | |
| 6,494,404 B1 * | 12/2002 | Meyer | 244/118.2 |
| 7,086,677 B2 * | 8/2006 | Boe et al. | 294/81.51 |

(Continued)

FOREIGN PATENT DOCUMENTS

EP     2 551 194     1/2013

OTHER PUBLICATIONS

Ruslan International, 124-100 Technical Specifications (www.ruslanint.com/Technical?ID=53).

(Continued)

*Primary Examiner* — Benjamin P Lee
(74) *Attorney, Agent, or Firm* — Walters & Wasylyna LLC

(57) ABSTRACT

An aircraft cargo compartment container crane system including an aircraft having an upper passenger compartment and at least one lower cargo compartment, wherein the passenger compartment and the cargo compartment are separated by a floor and a crane assembly connected to a structural element of the cargo compartment beneath the floor, wherein the crane assembly is configured to lift and move a cargo container within the cargo compartment along a longitudinal axis of the aircraft.

25 Claims, 17 Drawing Sheets

(56) References Cited

U.S. PATENT DOCUMENTS

| | | | |
|---|---|---|---|
| 7,270,297 B2* | 9/2007 | Schaefer et al. | 244/137.1 |
| 7,377,398 B2* | 5/2008 | Lichinchi | 212/175 |
| 7,604,134 B2* | 10/2009 | Lichinchi | 212/175 |
| 8,011,617 B2* | 9/2011 | Curry et al. | 244/118.1 |
| 8,490,923 B2* | 7/2013 | Bosqueiro et al. | 244/137.1 |
| 2002/0148928 A1* | 10/2002 | Oki | 244/118.1 |
| 2004/0188564 A1* | 9/2004 | Boe et al. | 244/118.1 |
| 2005/0184194 A1* | 8/2005 | Schaefer et al. | 244/118.1 |
| 2007/0040066 A1* | 2/2007 | McCoskey et al. | 244/137.1 |
| 2007/0163982 A1* | 7/2007 | Lichinchi | 212/175 |
| 2008/0223805 A1* | 9/2008 | Lichinchi | 212/175 |
| 2011/0068225 A1* | 3/2011 | Curry et al. | 244/118.1 |
| 2011/0215198 A1* | 9/2011 | Panzram et al. | 244/118.1 |
| 2012/0126056 A1* | 5/2012 | Curry et al. | 244/118.1 |
| 2012/0160961 A1* | 6/2012 | Curry et al. | 244/118.1 |
| 2013/0186999 A1* | 7/2013 | Huber, Thomas | 244/118.1 |

OTHER PUBLICATIONS

International Search Report and Written Opinion, PCT/US2013/061495 (2013).

\* cited by examiner

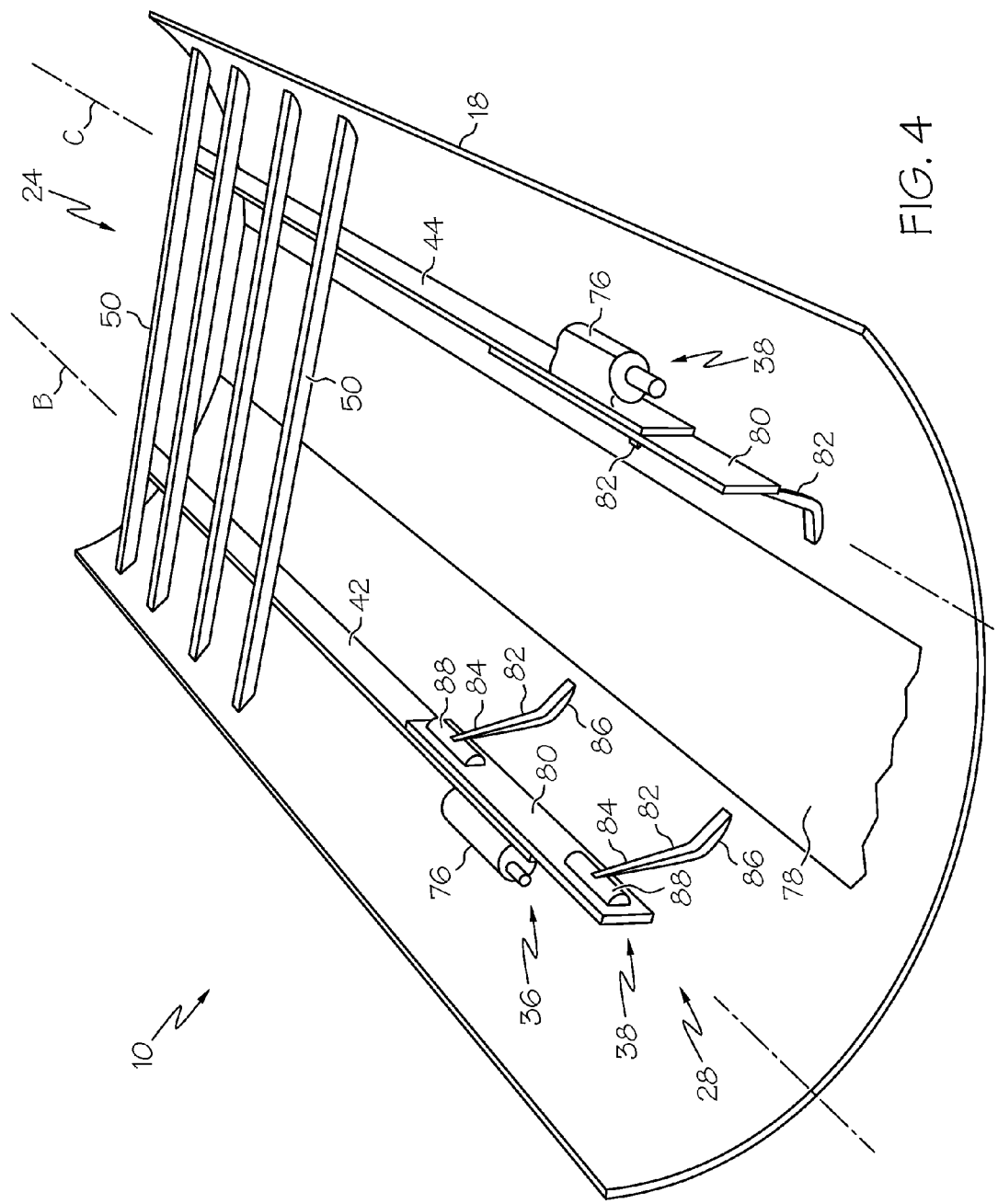

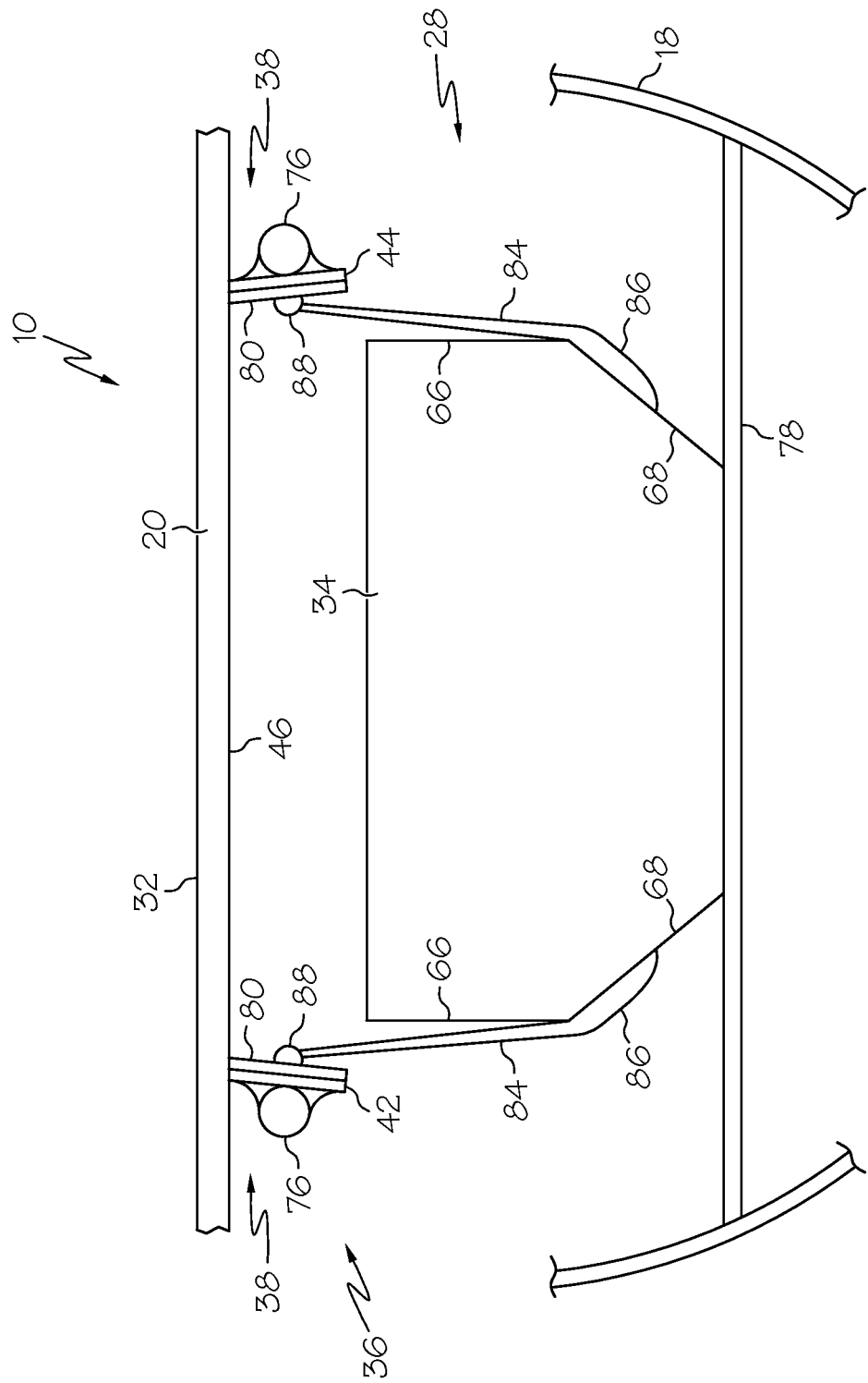

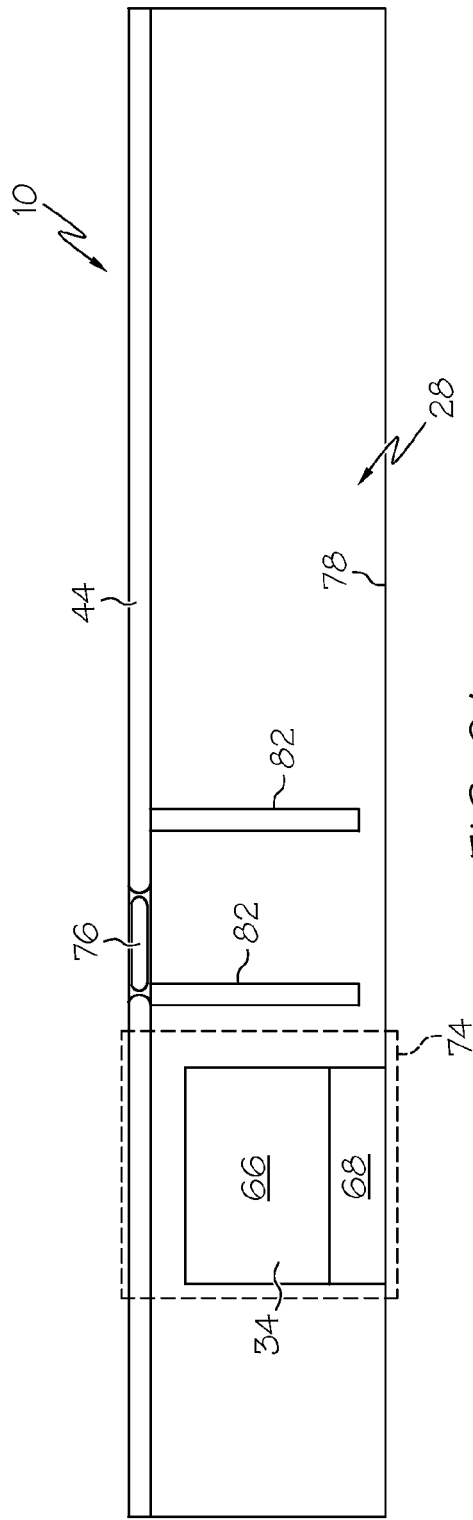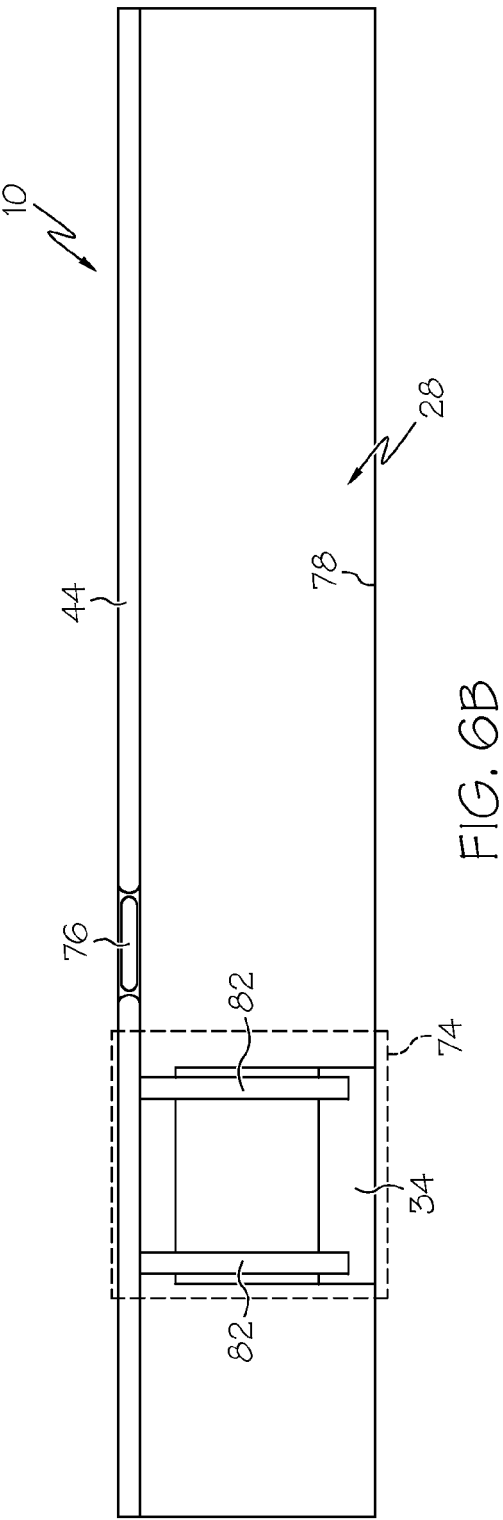

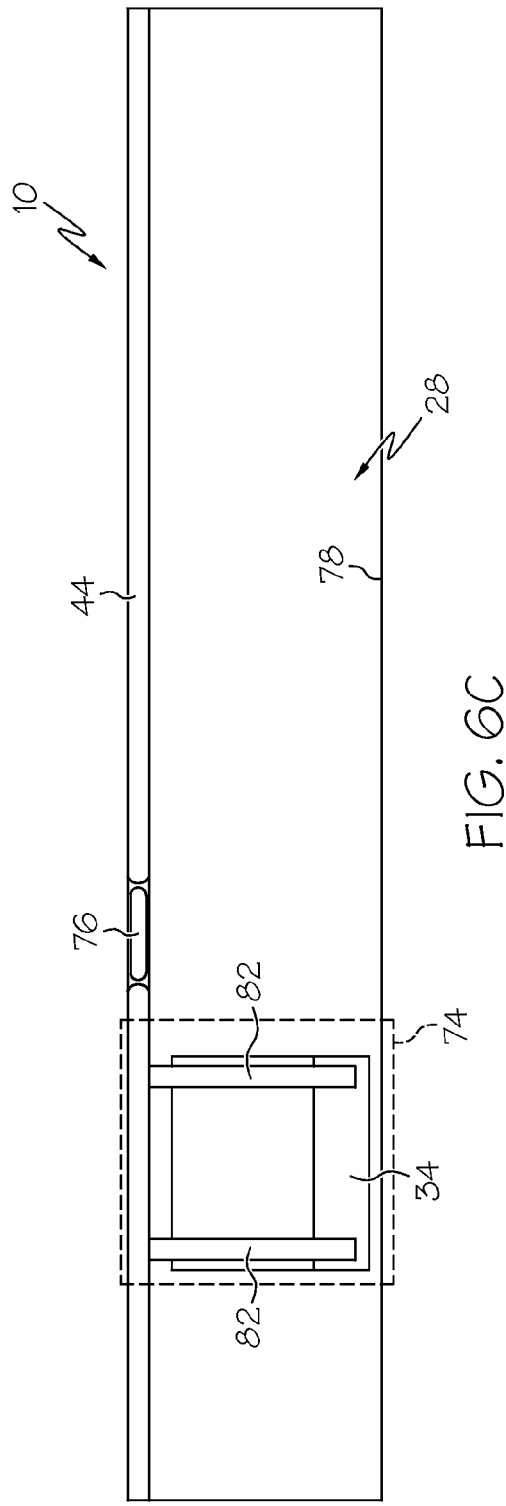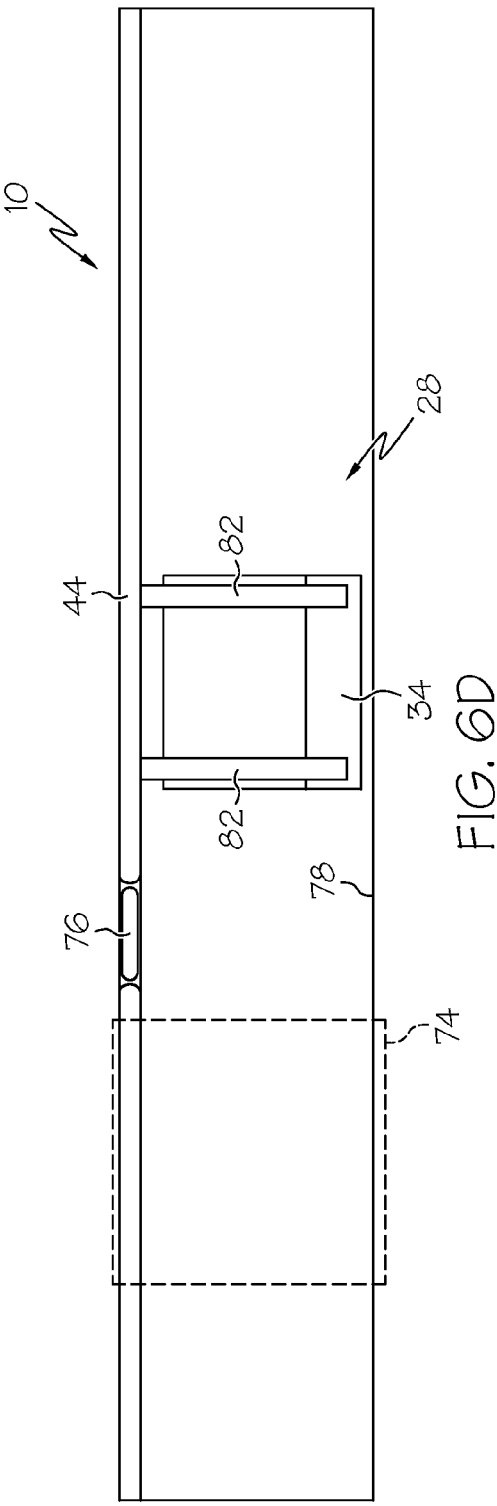

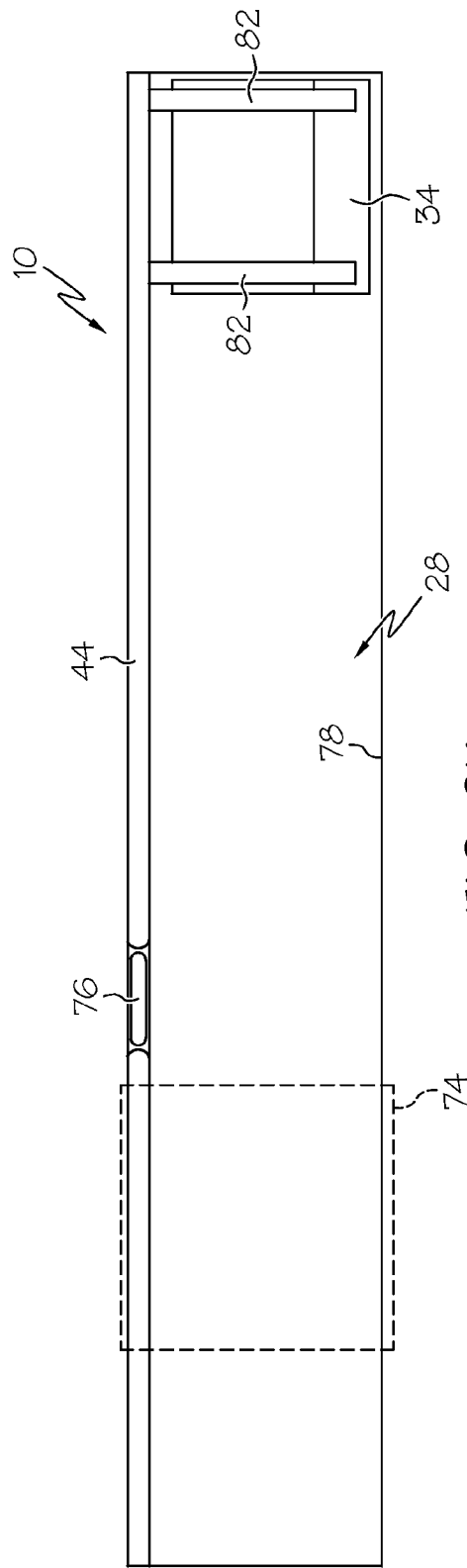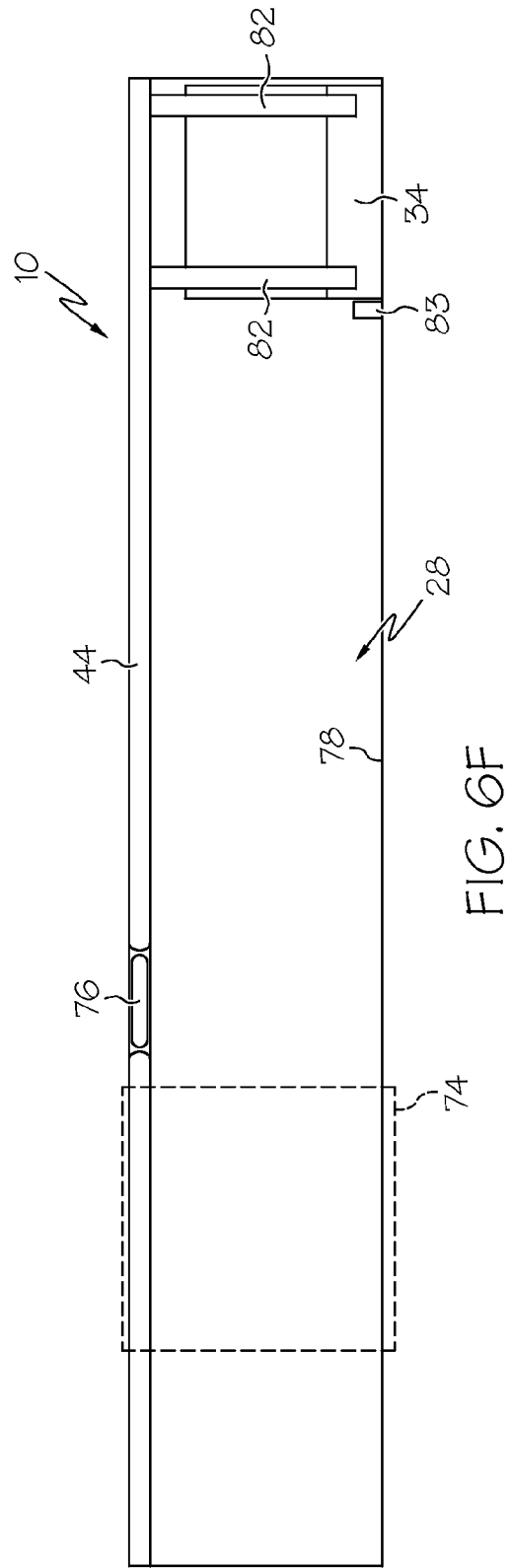

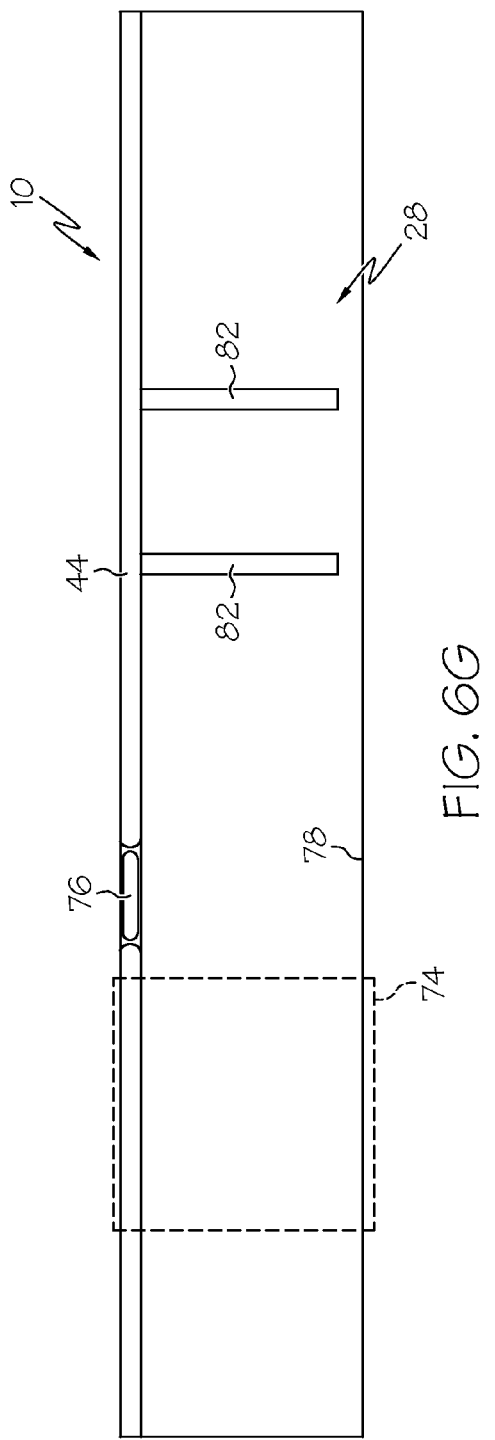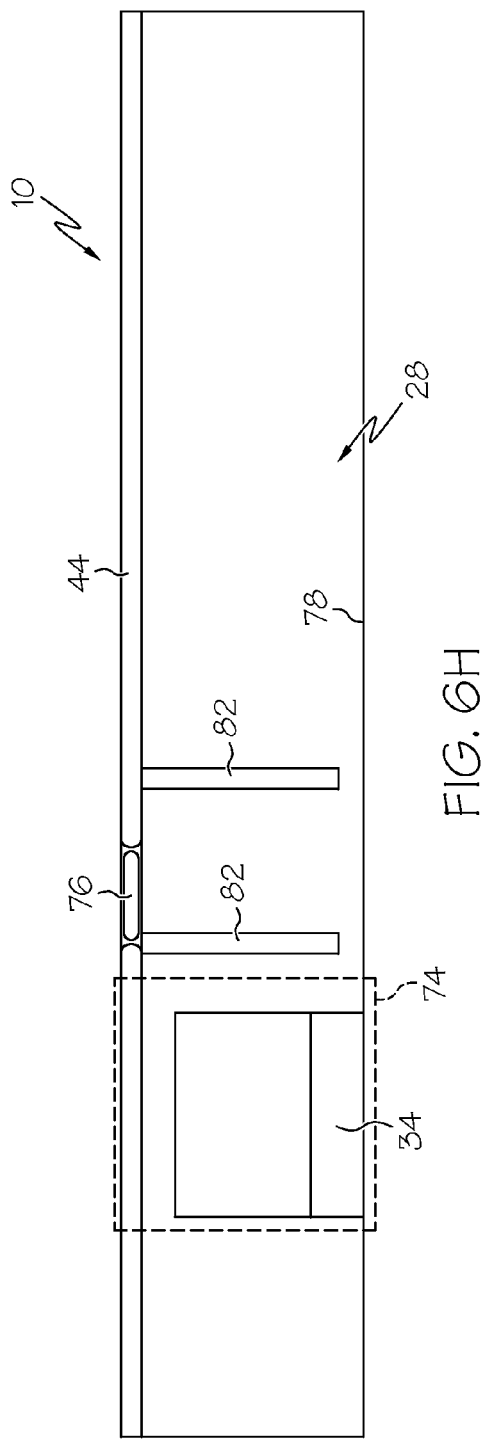

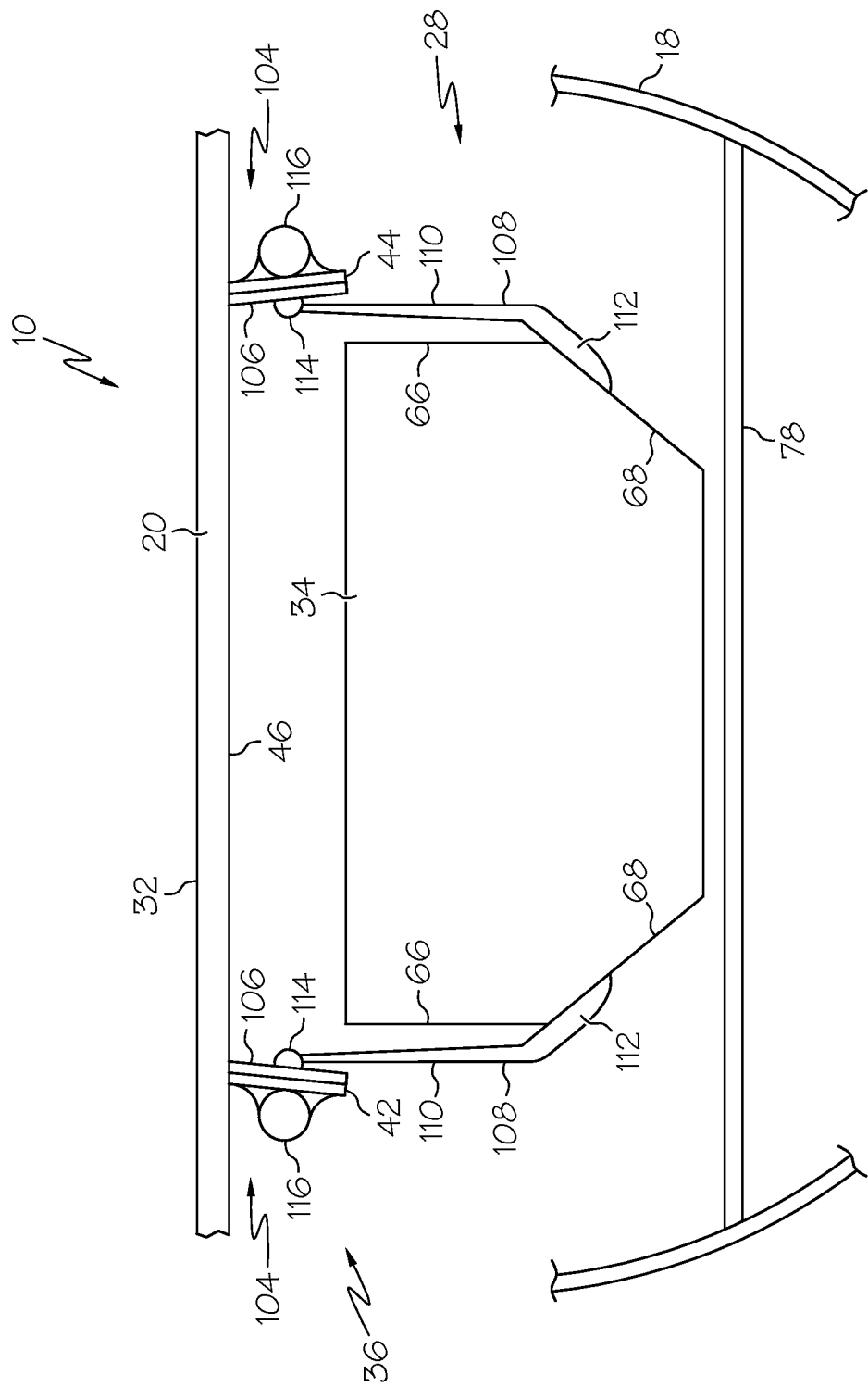

AIRCRAFT CARGO COMPARTMENT CONTAINER CRANE SYSTEM

FIELD

The present disclosure generally related to carrying cargo in aircraft and, more particularly, to systems and methods for loading cargo containers in aircraft

BACKGROUND

Commercial passenger aircraft commonly include a pressurized fuselage having a main upper deck for carriage of passengers and a lower deck exclusively for carriage of cargo during commercial flights. These cargo compartments are typically closed off areas located within the lower fuselage underneath the passenger deck floor. Such cargo compartments are traditionally filled with bulk cargo, which refers to any cargo that is not containerized, such as passenger suitcases manually loaded by baggage handling personnel into the cargo compartment. Many large aircraft employ quick loading containers known as Unit Load Devices (ULDs). A ULD is a container used to load luggage, freight, mail, or similar containerized items on wide-body aircraft and certain narrow-body aircraft. The ULDs allow for a large quantity of cargo to be bundled into a single unit, which leads to fewer load units and saves ground crews time and effort when loading the cargo compartment of the aircraft. Netted cargo pallets with defined base structure geometries are also specialized types of ULDs.

Cargo compartments include a ceiling, which corresponds to the passenger deck floor, and a floor which may be flat or curved to match the bottom contour of the fuselage. The floor of the cargo compartment typically includes rollers, power rollers, or ball mats to provide for movement of large cargo containers within the cargo compartment. This configuration requires a large number of rollers, stops, and locks on the floor surface in order to utilize and safely support cargo containers. Cargo compartments having floors that lack such rollers are not suitable for loading and carrying large cargo containers, and are provided on some aircraft to accommodate "bulk cargo," such as manually loaded passenger baggage. Furthermore, the roller floors require the containers to be manually moved and positioned at a desired storage location within the cargo compartment.

Accordingly, those skilled in the art continue with research and development efforts in the field of container loading of aircraft cargo compartments.

SUMMARY

In one embodiment, the disclosed aircraft cargo compartment container crane system may include an aircraft having an upper passenger compartment and at least one lower cargo compartment, wherein the passenger compartment and the cargo compartment are separated by a floor and a crane assembly connected to a structural element of the cargo compartment beneath the floor, wherein the crane assembly is configured to lift and move a cargo container within the cargo compartment along a longitudinal axis of the aircraft.

In another embodiment, the disclosed aircraft cargo compartment container crane system may include a crane assembly configured to operate within a cargo compartment under a passenger deck floor of an aircraft, the crane assembly including a pair of longitudinal tracks connected to a lower surface of the floor and a plurality of powered lift mechanisms, wherein at least one of the plurality of lifting mechanisms is connected to each track and configured to lift and translate a cargo container within the cargo compartment along a longitudinal axis of the aircraft.

In yet another embodiment, disclosed is a method of lifting and translating a cargo container axially along a longitudinal axis of a cargo compartment of an aircraft, the method may include the steps of (1) providing a crane assembly configured to operate within the cargo compartment under a passenger deck floor of the aircraft, the crane assembly including a pair of longitudinal tracks connected to a lower surface of the floor and a plurality of powered lift mechanisms, at least one of the plurality of lifting mechanisms connected to each track and configured to lift and translate the cargo container within the cargo compartment along a longitudinal axis of the aircraft, (2) providing at least one cargo container at an initial position within the cargo compartment, (3) translating the lift mechanisms over the cargo container, (4) lifting the cargo container, (5) translating the cargo container axially within the cargo compartment along the longitudinal axis to a storage location, and (6) lowering said cargo container.

Other embodiments of the disclosed aircraft cargo compartment container crane system will become apparent from the following detailed description, the accompanying drawings and the appended claims. The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 4 is a side perspective view of the aircraft cargo compartment container crane system;

FIG. 5B is a fragmented front elevation view of the container crane system of FIG. 5A, depicted rotated into an engaged position;

FIGS. 6A through 6H are schematic views of the operation of the disclosed container crane system; and, FIG. 7 is an exploded front perspective view of one embodiment of a crane assembly of the disclosed aircraft cargo compartment container system;

FIG. 9C is a fragmented front elevation view of the container crane system of FIG. 10, depicted in an engaged and lifted position.

DETAILED DESCRIPTION

Figure 1:
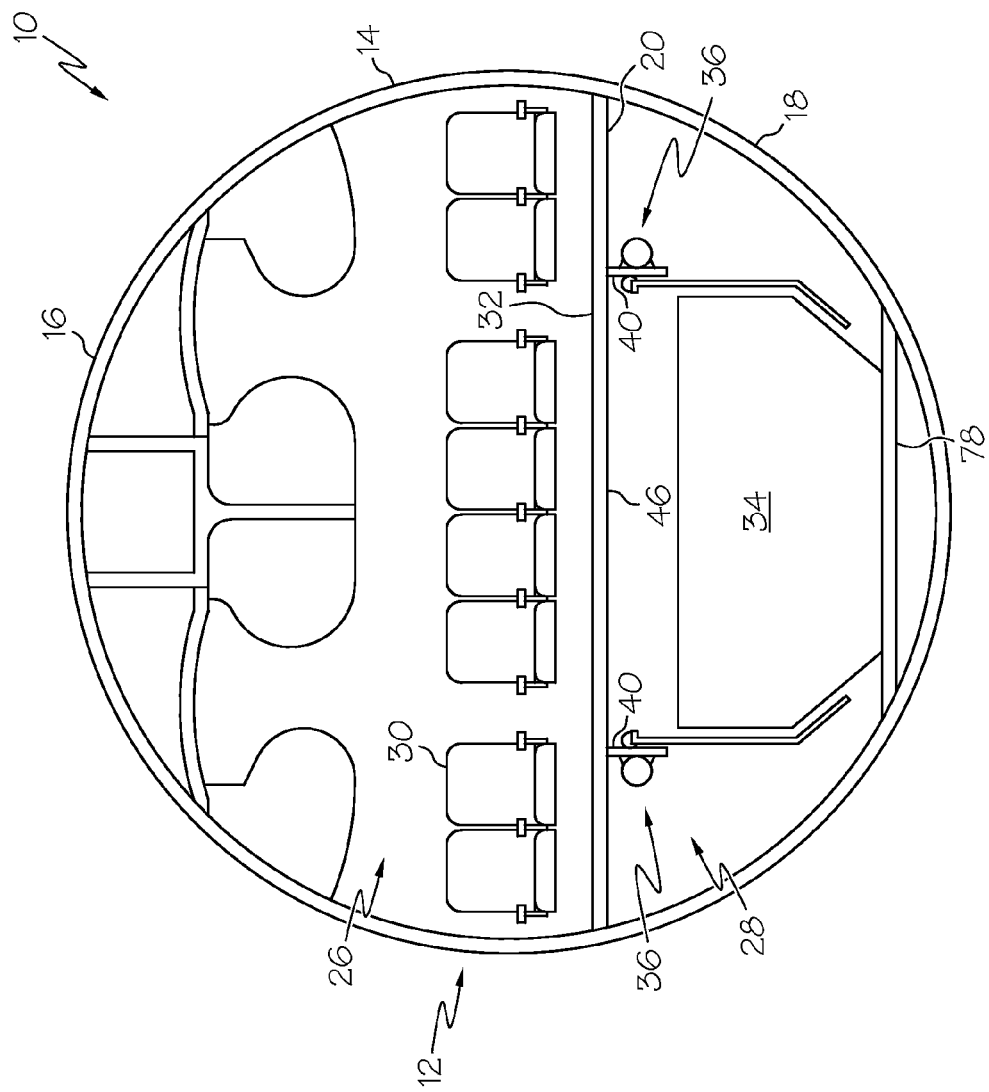
FIG. 1 is a front elevation view of one embodiment of the disclosed aircraft cargo compartment container crane system.

The following detailed description refers to the accompanying drawings, which illustrates specific embodiments of the disclosure. Other embodiments having different structures and operations do not depart from the scope of the present disclosure. Like reference numerals may refer to the same element or component in the different drawings.

Figure 3:
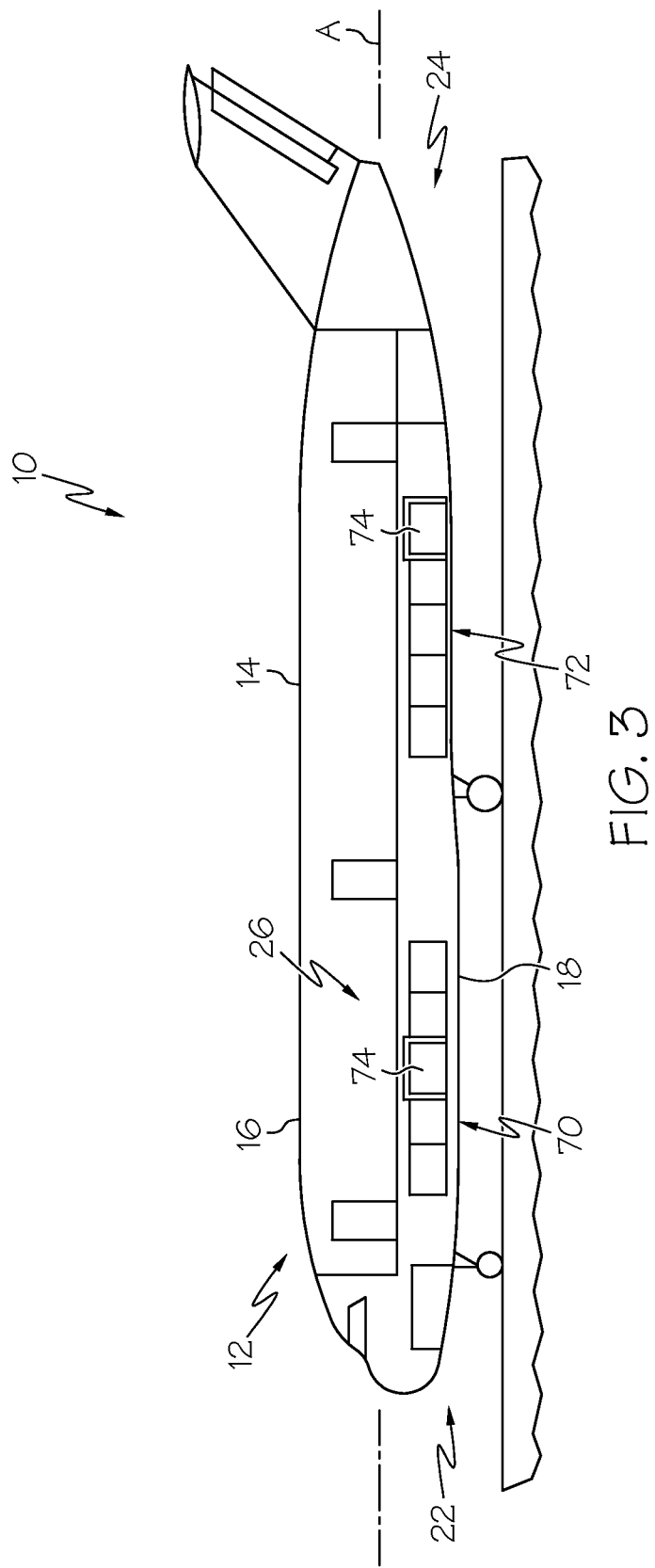
FIG. 3 is a side schematic view of an aircraft utilizing the disclosed the disclosed container crane system.

Referring to FIG. 3, an aircraft 12 may include a fuselage 14 that longitudinally extends along an axis A from proximate a front end 22 of the aircraft 12 to proximate a rear end 24 of the aircraft 12. The fuselage 14 may have a fuselage monocoque structure.

Referring to FIG. 1, the fuselage 14 may include an upper fuselage 16 and a lower fuselage 18. The upper and lower fuselages 16, 18 may be separated by a generally flat support floor 20 extending from the front end 22 to the rear end 24 of the aircraft 12 forming a passenger compartment 26 (i.e., upper deck) and a cargo compartment 28 (i.e., lower deck). The passenger compartment 26 may include a plurality of seats 30 affixed to an upper surface 32 of the floor 20 and carryon baggage storage compartments. The cargo compartment 28 may include a generally open area configured to hold one or more containers 34, bulk cargo, or a combination of both.

One embodiment of the aircraft cargo compartment container crane system, generally designated 10, may include one or more crane assemblies 36 provided within the lower deck cargo compartment 28 for lifting and translating a plurality of containers 34, one at a time or otherwise, to respective storage locations within the cargo compartment 28. As shown in FIG. 4, the crane assembly 36 may generally include a pair of powered lift mechanisms 38 which are configured to contact opposing sides of the container 34 in order to lift the container 34 and move it longitudinally within the cargo compartment 28.

Figure 2:
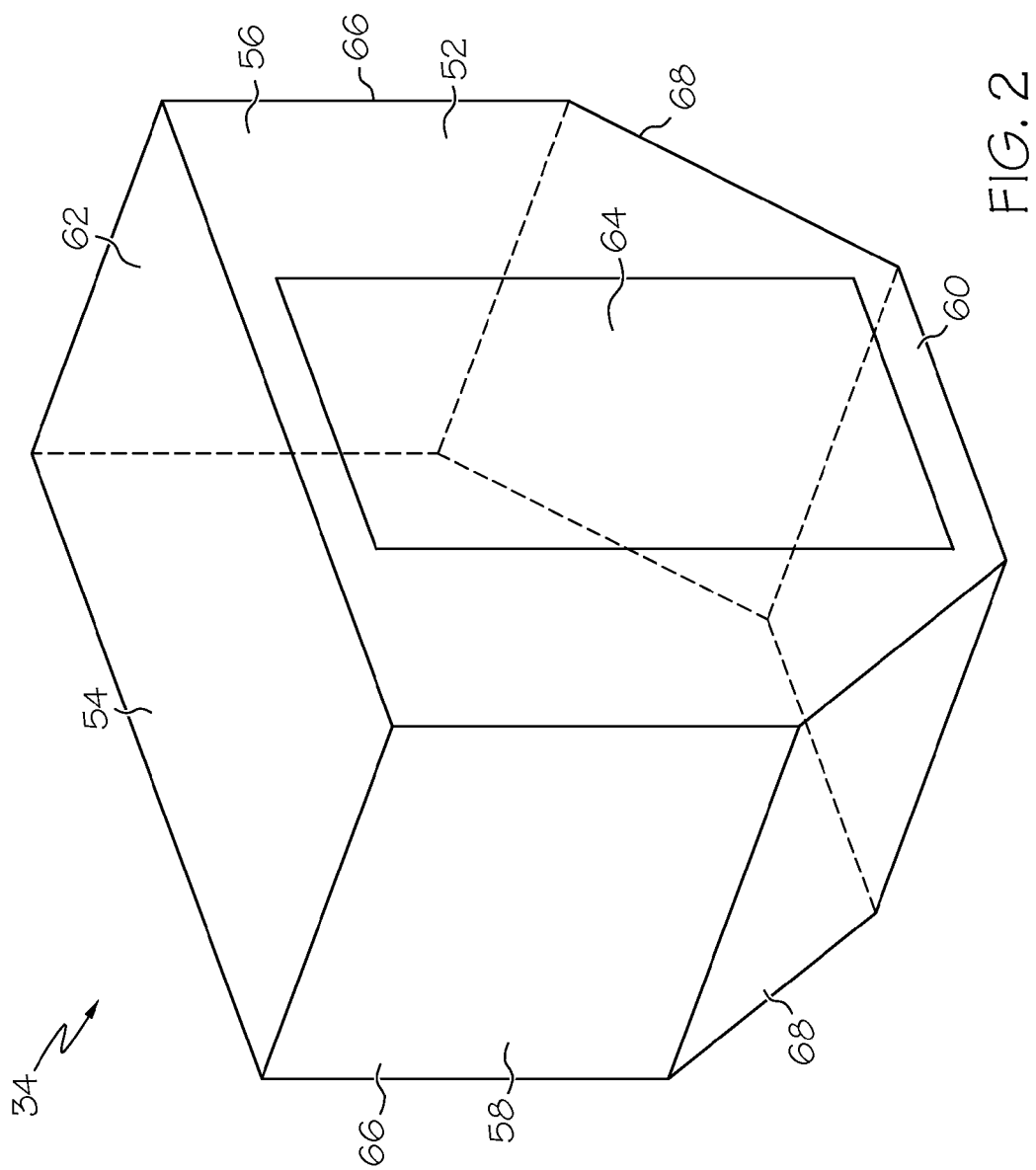
FIG. 2 is a front perspective view of a cargo container of the container crane system.

Referring to FIG. 2, the container 34 may be any container capable of holding a quantity of cargo and being transported in the cargo compartment 28 of the aircraft 12. For example, the container 34 may be a unit load device ("ULD"), also known as a can or pod, which may be a closed container typically made of aluminum or combination of aluminum frame and thermoplastic walls. Other ULDs may be fabricated from various metallic, nonmetallic or composite materials, without limitation. The container 34 may be a box having six walls 52, 54, 56, 58, 60, 62 that define an internal volume for receiving a load. Opposed walls 52, 54 may define the front wall 52 and the rear wall 54 of the container 34. Opposed walls 56, 58 may define the right side wall 56 and the left side wall 58 of the container 34. Opposed walls 60, 62 may define the lower wall 60 and the upper wall 62 of the container 34. The front wall 52 may include a door or a removable panel 64 to provide access to the internal volume of the container 34.

Figure 10:
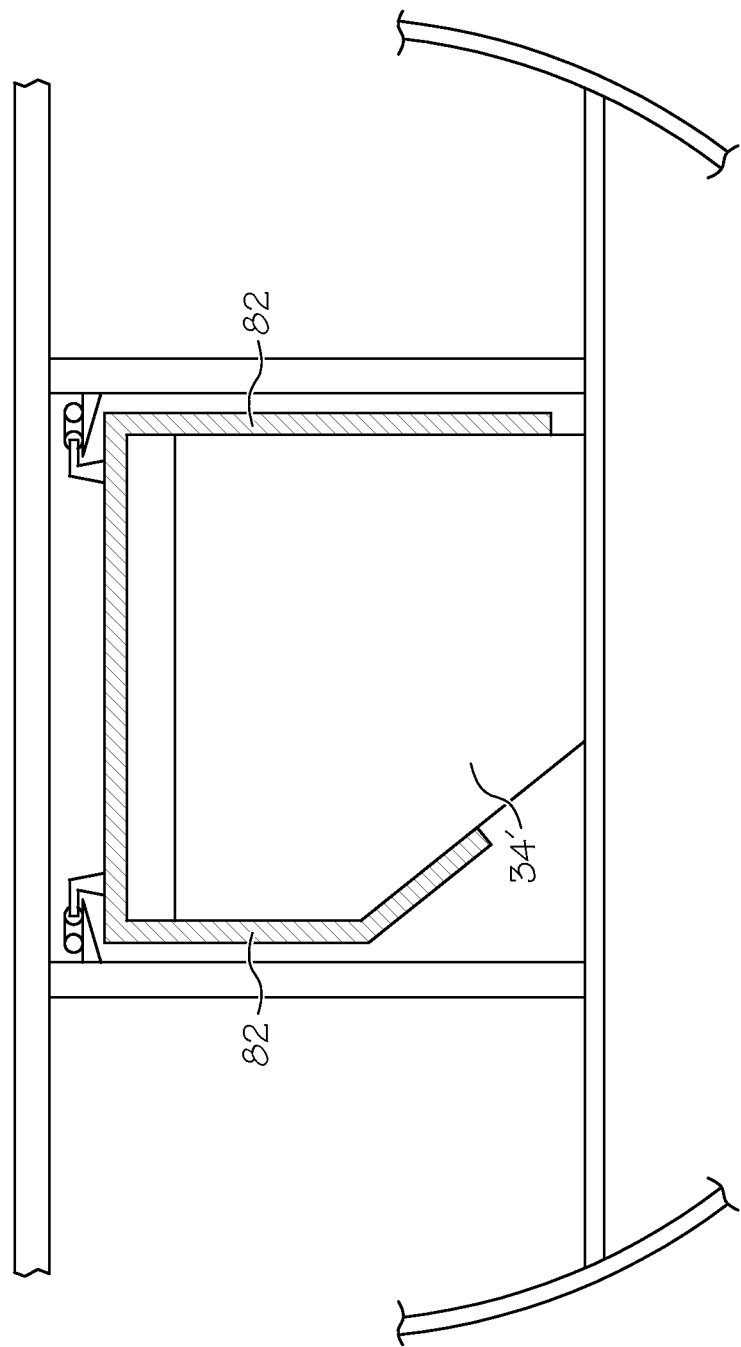
FIG. 10 is a fragmented front elevation view of yet another embodiment of the disclosed aircraft cargo compartment container crane system.

The container may have contoured right and left side walls 56, 58. For example the container 34 may be a "two-wing" LD6 or LD8 type, full width container. The right and left side walls 56, 58 may include a generally vertical upper section 66 connected at an upper end to the upper wall 62 and an inwardly angled lower section 68 (i.e., a downwardly facing wall) connected to the lower wall 60. In another example, as shown in FIG. 10, the container 34' may be a "one-wing" LD1 or LD2 or LD3, half width container having one vertical side wall and one contoured side wall. In such an example, one side wall may include a generally vertical upper section connected at an upper end to an upper wall and an inwardly angled (downward facing) lower section connected to a lower wall. Shorter half-width containers, such as LD3-45 or LD3-46 containers (that are 45 or 46 inches tall, respectively) may be used. Also, "two-wing" versions of these containers, such as LD3-45W or LD3-46W, may also be used.

Referring next to FIG. 3, the aircraft 12 may include one or more cargo compartments disposed within the lower fuselage 18. FIG. 3 illustrates the aircraft 12 having a first (i.e., forward) cargo compartment 70 and a second (i.e., aft) cargo compartment 72, where each compartment 70, 72 may be suitably sized to accommodate a number (e.g., five) containers 34. Each cargo compartment 70, 72 may include a cargo door 74 to provide access for loading of containers 34. As illustrated, the forward cargo compartment 70 may include a cargo door 74 positioned at a mid-compartment location and the aft cargo compartment 72 may include a cargo door 74 positioned at a rear-compartment location. As illustrated in FIG. 3, in one implementation of the aircraft cargo compartment container crane system 10, crane assemblies 36 may be disposed in each cargo compartment 70, 72; however, it can be appreciated by one skilled in the art that the aircraft 12 may have a crane assembly 36 in only one cargo compartment 70 such that the other cargo compartment 72 may be used exclusively for bulk cargo. It can also be appreciated by one skilled in the art that the number of cargo compartments 28 and the total number of containers 34 accommodated by each cargo compartment 70, 72 may vary depending upon the size and type of aircraft 12, and is not meant to limit the scope of the present disclosure. It can also be appreciated that the cargo door 74 of any cargo compartment 70, 72 may be indexed at different locations in the cargo compartments 70, 72.

In other embodiments of the container crane system 10, certain major components of the crane assemblies 36 may be easily removed from within the cargo compartments 70, 72 through the cargo door 74 for flights where containers 34 are not carried.

Referring now to FIG. 4, the crane assembly 36 may include a frame 40 having a left track 42 and a laterally spaced apart and parallel right track 44. The left track 42 may be positioned below a lower surface 46 of the floor 20 (FIG. 1) and may extend along a track axis B, which may be generally parallel with the longitudinal axis A, from a front end 22 to a rear end 24 of the aircraft 12 within the cargo compartment 28. The right track 44 may be positioned below a lower surface 46 of the floor 20 (FIG. 1) and may extend along a track axis C, which may be generally parallel with the longitudinal axis A, from a front end 22 to a rear end 24 of the aircraft 12 within the cargo compartment 28.

For example, the tracks 42, 44 may be attached to a plurality of main support beams 50 of the floor. The lift mechanisms 38 are movably connected to each track 42, 44, such that the lift mechanisms 38 may translate longitudinally within the cargo compartment 28. The lift mechanisms 38 may be driven along the tracks 42, 44 between the front and rear ends of the cargo compartment 28 by a motor 76, including the area directly adjacent an opening of the cargo door 74. The tracks 42, 44 may be appropriately positioned at an adequate height to accommodate lateral insertion of containers 34 into the cargo compartment 28 through the cargo door 74.

Each lift mechanism 38 may include a rail 80 designed to engage and ride along the tracks 42, 44. At least one lifting arm 82 (two lifting arms 82 are shown by example) may be pivotably attached to each rail 80 and may extend downwardly toward a container support floor 78 of the cargo compartment 28. Each lifting arm 82 may include a generally vertical upper end 84 and an inwardly angled lower end 86. The rail 80 may also include an actuating mechanism 88 mechanically connected to the upper end 84 of the lifting arm 82 to rotate the lifting arm 82 inwardly and outwardly.

Alternatively, when the container 34' includes only one downward facing surface, as shown in FIG. 10, one lifting arm 82 may include a generally vertical upper end and an inwardly angled lower end to engage the downward facing surface, while the other lifting arm 82 may be substantially straight (since there is no downward facing surface on the other side of the container 34').

The container support floor 78 adjacent the opening of the cargo door 74 may include rollers, power rollers, a ball mat or a low friction surface, for example polytetrafluoroethylene (i.e., TEFLON), to facilitate lateral loading and unloading of the container 34 into the cargo compartment 28. Optionally, the cargo support floor 78 may longitudinally extend along the cargo compartment to laterally position and longitudinally slide the containers 34 along the surface of the floor 78. The cargo support floor 78 may be supported above the fuselage monocoque structure.

Referring next to FIGS. 5A-5C and 6A-6H, a container 34 may be loaded into an initial position on the floor 78 within the cargo compartment 28 through the cargo door 74 (FIG. 6A). An optional load transfer unit may be used to initially load the container 34 through the cargo door 74 into the cargo compartment 28. For example, the load transfer unit may be (or may include) one or more of the following: a roller tray, a ball mat, a support surface with partially buried rollers, a support surface with a partially buried belt, a conveyor belt, and a low friction sliding surface.

Figure 5A:
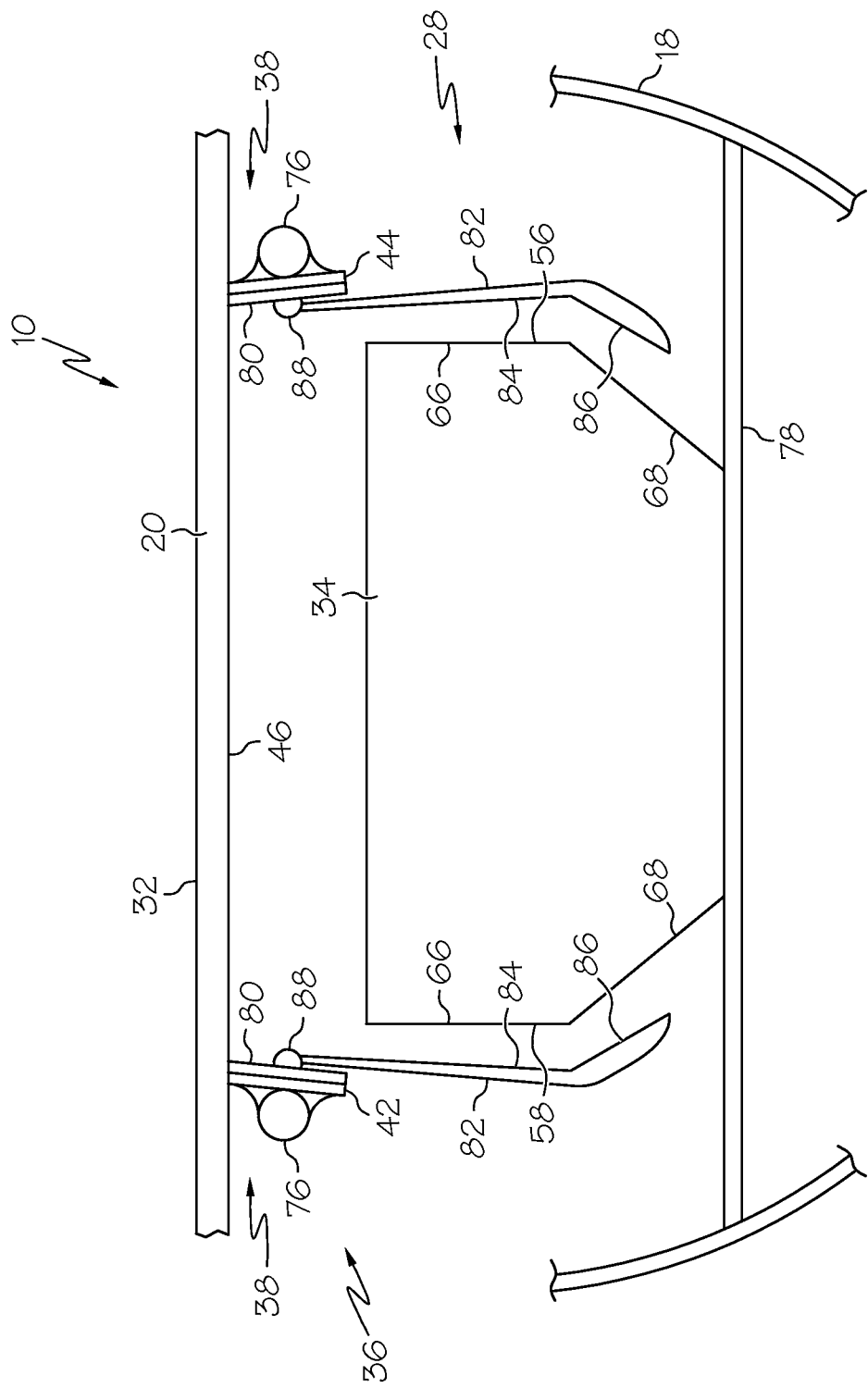
FIG. 5A is fragmented front elevation view of container crane system of FIG. 1, depicted in a preengaged position.

The lift mechanisms 38 may be moved along the tracks 42, 44 over the container 34, such that the lifting arms 82 of each lift mechanism 38 are longitudinally aligned with opposing side walls 56, 58 of the container 34 (FIG. 6B). The lifting arms 82 may be positioned along the rail 80 such that the outermost lifting arms 82 of any plurality of lifting arms 82 are spaced apart at distance less than the width of the container 34 measured from front wall 52 to rear wall 54. The upper end 84 of the lifting arms 82 may downwardly extend from the rail 80 past the upper section 66 of the side wall 56, 58, such that the lower end 86 is positioned generally parallel to the lower section 68 of the side walls 56, 58. At this point the crane assembly 36 is in a preengaged position with the lifting arms 82 away from the container (FIG. 5A).

Figure 5C:
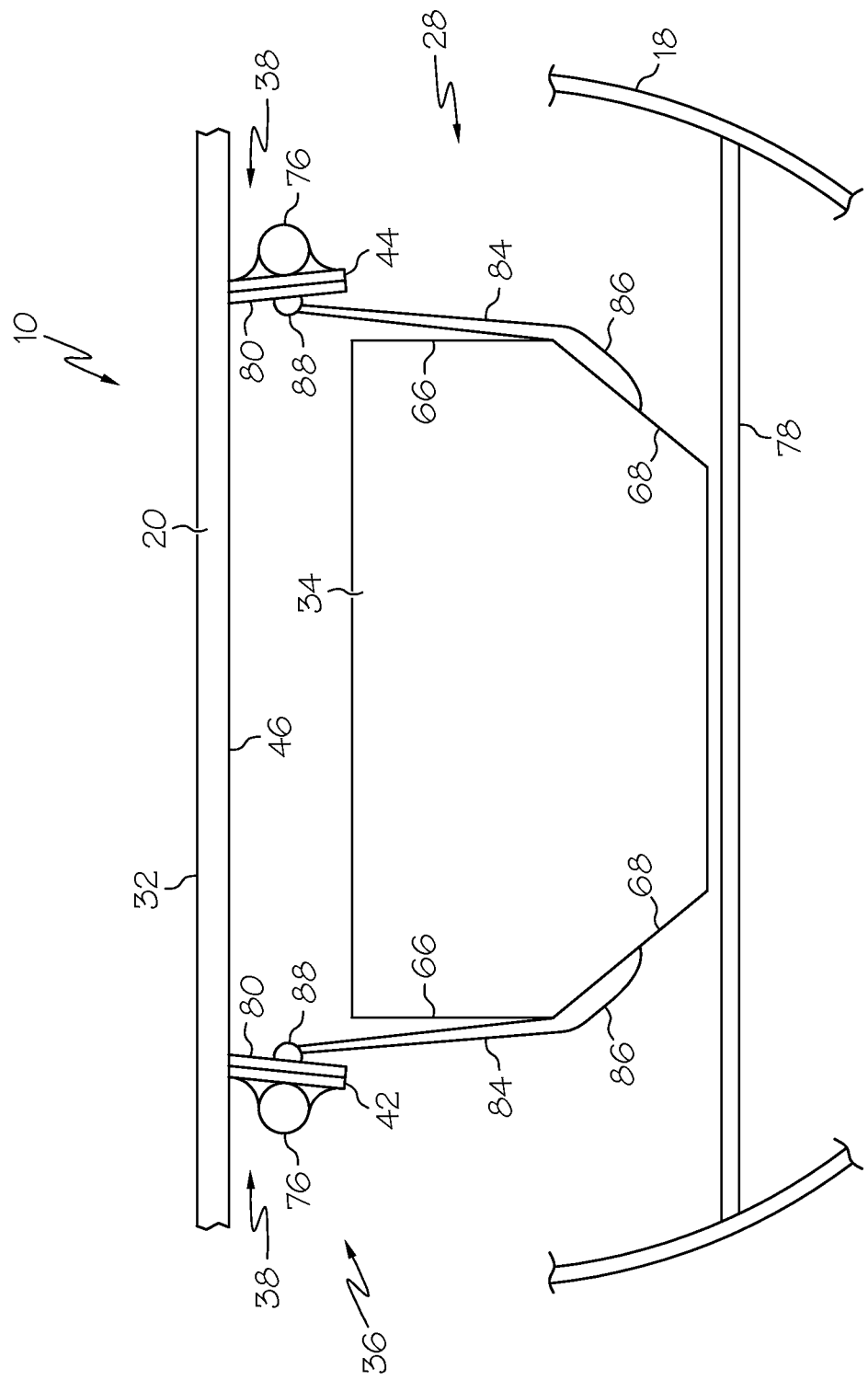
FIG. 5C is a fragmented front elevation view of the container crane system of FIG. 5B, depicted in a rotated, engaged and lifted position.

The rotary actuating mechanism 88 may be any suitably mechanism actuating device and may rotate the lifting arms 82 inwardly such that the lower ends 86 contact the lower sections 68 of the side walls 56, 58 of the container 34. At this point the crane assembly 36 is in an engaged position (FIG. 5B). An inner surface of the upper end 84 and the lower end 86 of the lifting arms 82 may be flat to make suitably flush contact with the exterior surfaces of the side walls 56, 58 of the container 34. As the lifting arms 82 continue to rotate inwardly, the container 34 may be lifted off of the floor 78 as the lower sections 68 of the side walls 56, 58 slide upwardly upon the flat inner surface of the lower ends 86 of the lifting arms 82 in response to the force applied by the lifting arms 82. At this point the crane assembly is in an engaged and lifted position (FIG. 5C).

Once the container 34 has been lifted from the floor 78 (FIG. 6C), the motor 76 may mechanically act upon the rail 80, driving the lift mechanisms 38 along the tracks 42, 44 and moving the container 34 longitudinally within the cargo compartment 28 (FIG. 6D). The container 34 may be moved by the crane assembly 36 to a selected storage location within the cargo compartment 28 (FIG. 6E). Once the container 34 is positioned at the selected storage location, the actuating mechanisms 88 may lower the lifting arms 82 and/or rotate the lifting arms 82 outward. In the case of rotating lifting arms 82, as the lifting arms 82 begin to move away from the side walls 56, 58 of the container 34, the container 34 may slide downward upon the lower ends 84 of the lifting arms 82 until the container 34 rests upon the support floor 78 at the selected location (FIG. 6F). The lifting arms 82 may continue to rotate outwardly to the preengaged position no longer contacting the container 34.

Referring to FIG. 6F, an optional securement device 83 may secure the cargo container 34 after it has been positioned within the cargo compartment 28 as desired. The securement device 83 may prevent the cargo container 34 from axially sliding along the floor 78 of the cargo compartment 28. As one example, the securement device 83 may be (or may include) a stop, such as a fixed stop or a deployable stop. As another example, the securement device 83 may be (or may include) a lock, such as a manual lock or an automatic lock.

The motor 76 may drive the lift mechanisms 38 in an opposing longitudinal direction (FIG. 6G) until the lift mechanisms 38 are returned to an original position adjacent the opening of the cargo door 74 (FIG. 6H). This process may be repeated for subsequently loaded containers 34, which are lifted and moved to respective storage locations within the cargo compartment 28.

Figure 7:
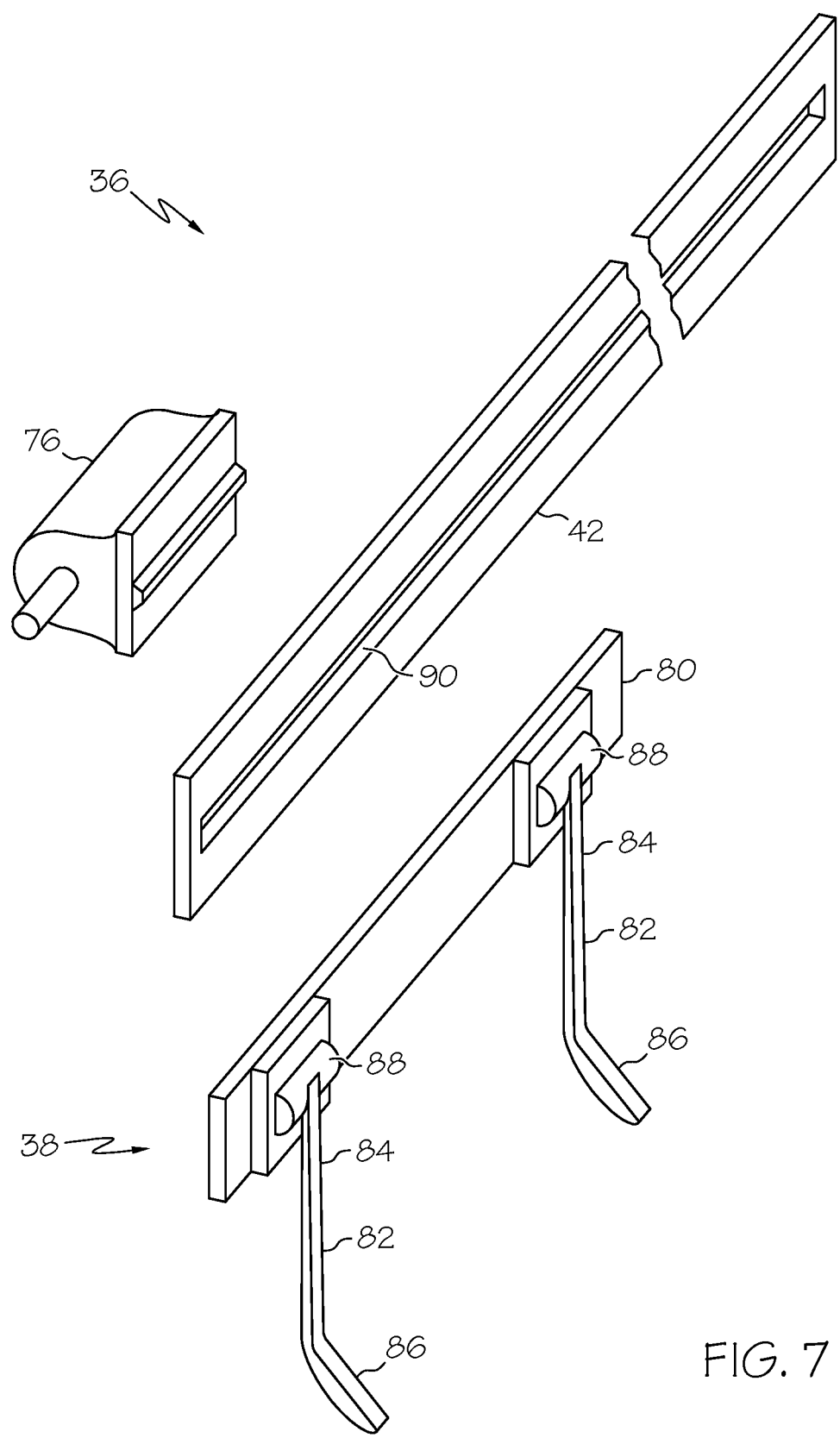

Referring to FIG. 7, the rails 80 may be movably connected to the tracks 42, 44 in any suitable manner and as such one skilled in the art can appreciate that the described embodiments merely represent certain possible configurations and are not meant to limit the scope of the present disclosure. For example, the tracks 42, 44 may include at least one groove or conduit suitably sized to contain opposing top and bottom side edges of the rail 80. Alternatively, the rail 80 may be fastened to a support guide or slider mechanism mechanically connected internally to the tracks 42, 44. In another example, the rail 80 may also include a plurality of guide rollers rotationally supported within the tracks 42, 44. It can be appreciated by one skilled in the art that rollers may be attached to the rail 80 with a roller interface between the track 42, 44 or the rollers may be attached to the track 42, 44 with a track interface between the rail 80. In yet another example, the interface surface between the track 42, 44 and the rail 80 may include a low friction surface. In still another example, the tracks 42, 44 may include longitudinal screws and the rails 80 may include a ball screw mechanism mechanically connected to the screws of the tracks 42, 44 to linearly translate the lift mechanisms 38 along the tracks 42, 44.

The crane assembly 36 may include orbital gears, a rack and pinion assembly, chains, belts, worm gears, or any other suitable linear drive train connected between the motor 78 and the lift mechanism 38 to move the rail 80 relative the track 42, 44. The motor 76 may be attached to the track 42, 44 and mechanically connected to the rail 80 of the lift mechanism 38. Alternatively, the motor 76 may be attached to the rail 80 and mechanically connected to the track 42, 44. As illustrated by example in FIG. 7, the tracks 42, 44 may include a longitudinal channel 90 to provide access for the mechanical connection between the motor 76 and the lift mechanism 38.

The motor 76 may be any suitable electric, hydraulic, or pneumatic drive mechanism and may receive power from aircraft 12. The motor 78 may be electrically, hydraulically, or pneumatically connected to a suitable power supply within the aircraft 12. The motor 78 may also be operably connected to and may power the actuating mechanism 88 of the lift mechanism 38. Alternatively, the actuating mechanism 88 may include its own independent rotary drive mechanism and power supply. As one example, the motor 78 may be electrically connected to reel-out power cord which is also electrically connected to a power connection port of the passenger compartment 26. In another example, the tracks 42, 44 may include a plurality of electrical contacts which provide power to the motor 78 through track 42, 44 and rail 80 contact interfaces.

The container crane system 10 may also include a plurality of associated controls, including microprocessors electronically connected to the crane assembly 36 to energize the motor 76, to linearly move the lift mechanisms 38 to a selected location within the cargo container 28, and to actuate the lifting arms 82. The controls may be any suitable electronic control panel having a human interface.

Optionally, the container crane system 10 may include a plurality of position and operation sensors mounted at specified locations on the tracks 42, 44 to provide signaling indications of the relative position of the lift mechanisms 38 on the tracks 42, 44 and relative operational conditions of the crane assembly 36. The controls may be programmed to respond in a specified manner when certain positional or operational conditions occur.

In other embodiments of the disclosed aircraft cargo compartment container crane system 10 the lower ends 84 of the lifting arms 82 may include additional features to further assist in engaging and lifting the containers 34. For example, the lower ends 84 of the lifting arms 82 may include a magnet or an electromagnet to magnetically engage a magnetic surface of the container 34. In another example, the lower ends 84 of the lifting arms 82 may include curved ends or hooks to hook and engage an exterior post or in interior slot disposed on side walls 56, 58 of the container 24.

Another embodiment of the disclosed container crane system may include the lift mechanism 38 having a rail 80 with a single rotary actuating mechanism 88 and a single, wide lifting arm 82 configured to span the majority of the width of the container 34. The lifting arm 82 may be pivotably attached to the rail 80 and may extend downwardly toward the container support floor 78 of the cargo compartment 28. As with the plurality of thinner lifting arms 82, the wide lifting arm 82 may include a generally vertical upper end 84 and an inwardly angled lower end 86. The actuating mechanism 88 may be mechanically connected to the upper end 84 of the lifting arm 82 to rotate the lifting arm 82 inwardly and outwardly. The upper end 84 of the lifting arms 82 may downwardly extend from the rail 80 past the upper section 66 of the side wall 56,58 of the container 34 such that the lower end 86 may be positioned generally parallel to the lower section 68 of the side walls 56, 58 in the preengaged position.

Figure 8:
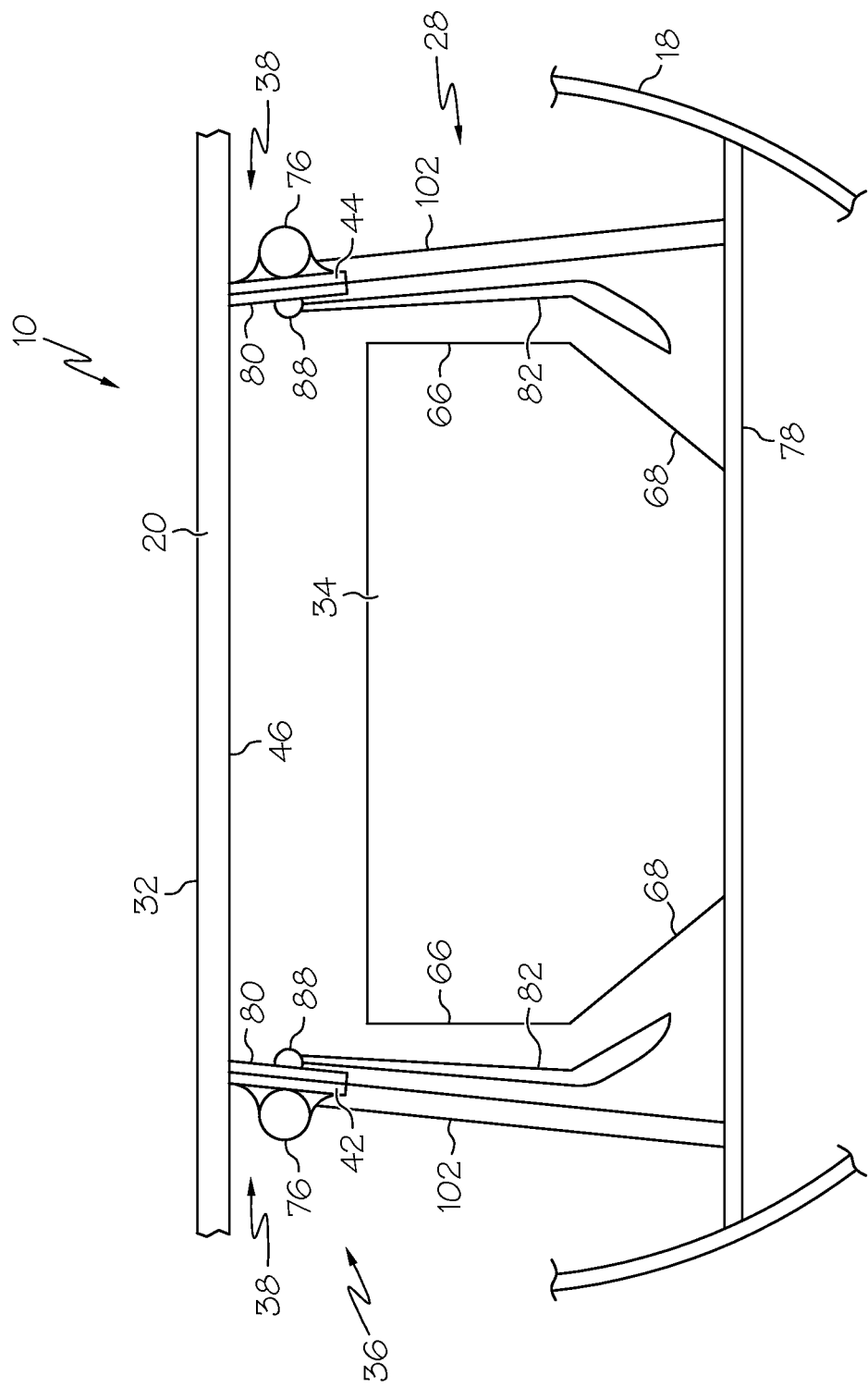
FIG. 8 is a fragmented front elevation view of another embodiment of the disclosed aircraft cargo compartment container crane system.

Referring to FIG. 8, another embodiment of the disclosed container crane system 10 may include the frame 40 that may be supported by a plurality of stanchions 102 extending from the tracks 42, 44 to the lower fuselage 18. The plurality of stanchions 102 may be spaced apart and parallel throughout the cargo compartment 28. The stanchions 102 may be positioned perpendicularly relative to the tracks 42, 44 and floor 20 or may be positioned at an angle relative to the tracks 42, 44 and floor 20. Alternatively, the tracks 42, 44 may be supported entirely by the stanchions 102 being attached to inwardly facing sides of upper ends of the stanchions 102.

Figure 9A:
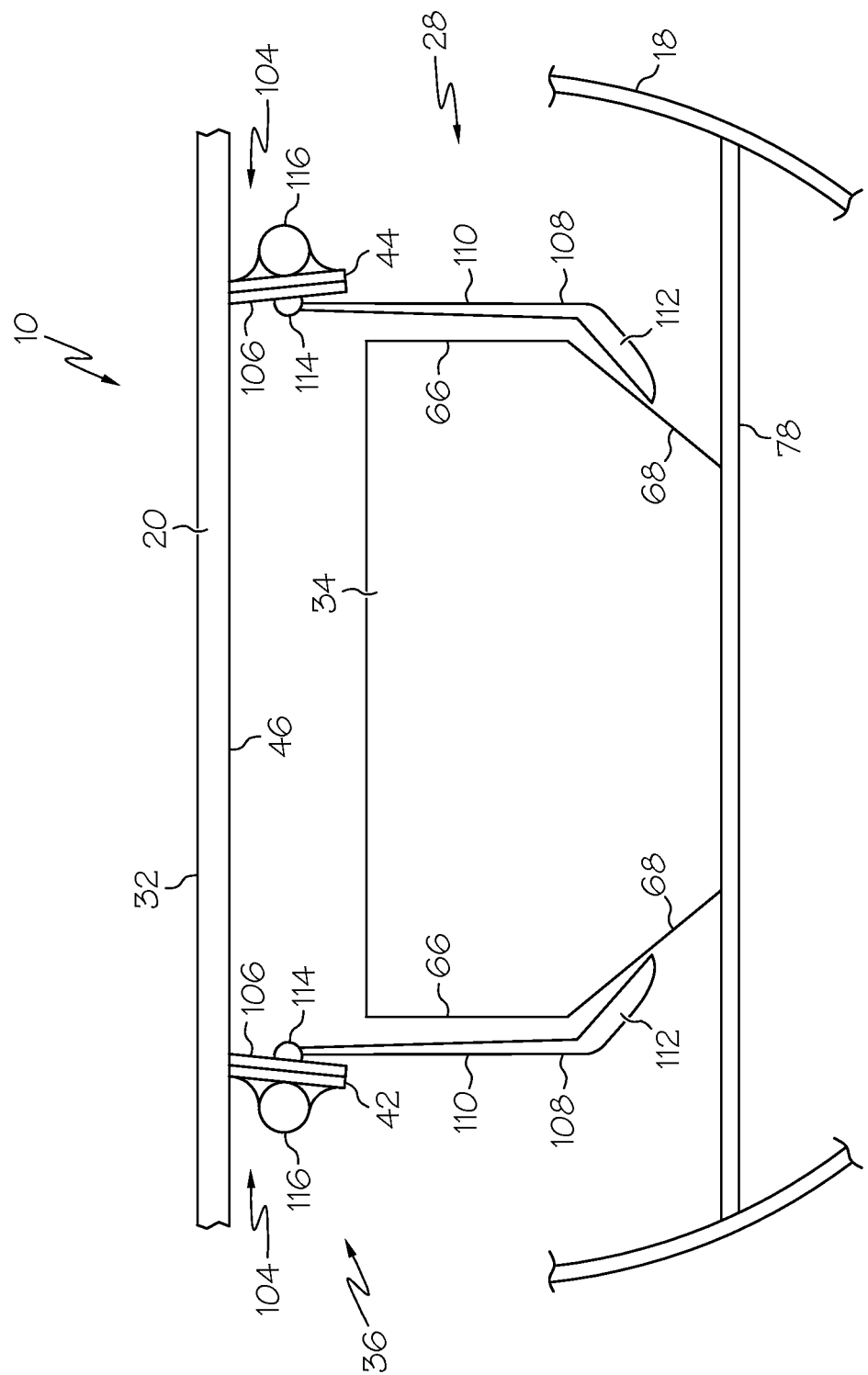
FIG. 9A is fragmented front elevation view of another embodiment of the disclosed aircraft cargo compartment container crane system, depicted in a preengaged position.
Figure 9B:
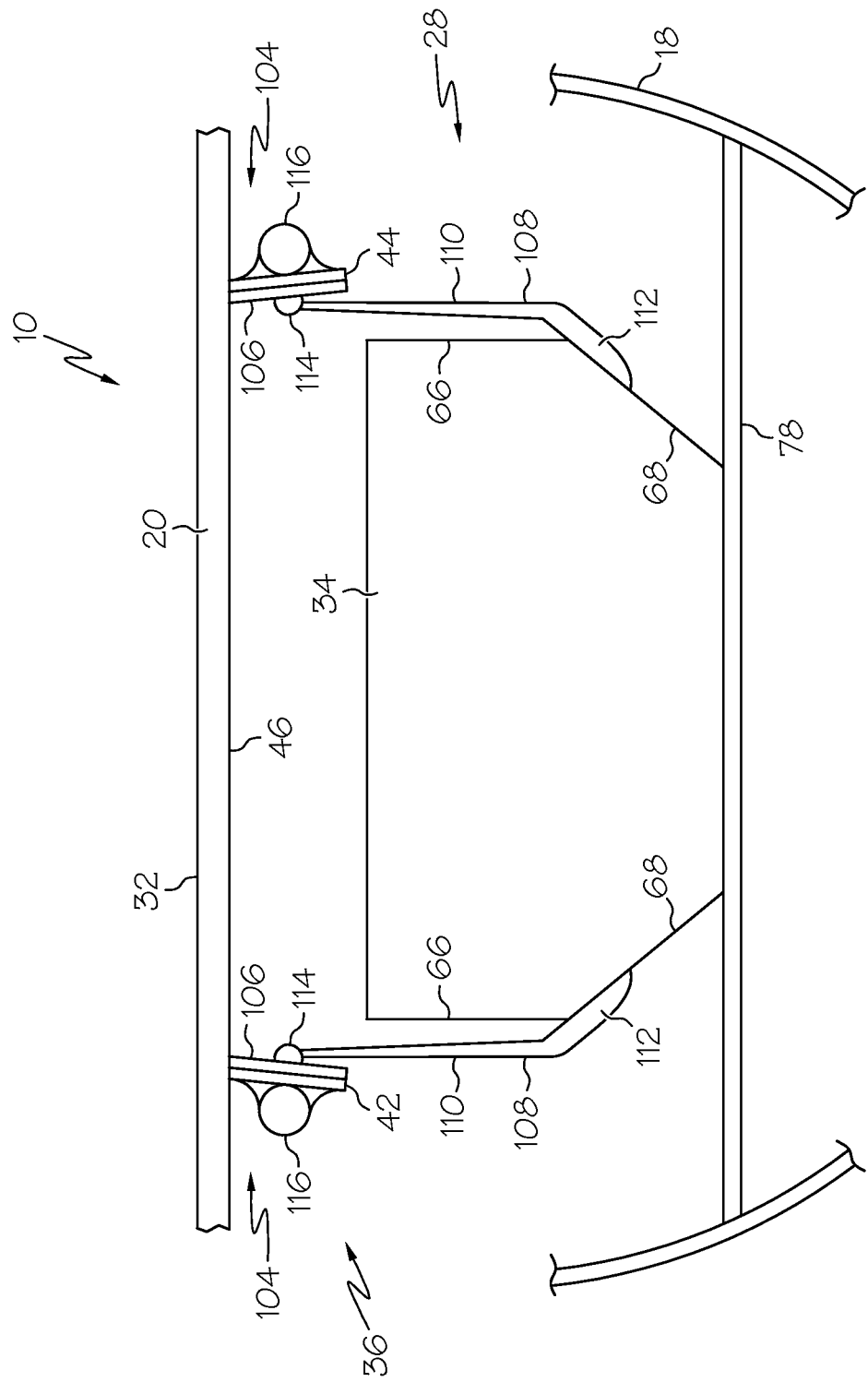
FIG. 9B is a fragmented front elevation view of the container crane system of FIG. 10, depicted in an engaged position.

Referring next to FIG. 9A through 9C, another embodiment of the disclosed aircraft cargo compartment container crane system 10 may include the crane assembly 36 having at least two linear lift mechanisms 104 to lift and move containers 34 within the cargo container 28. Each lift mechanism 104 may include a rail 106 designed to engage and ride along the tracks 42, 44. At least one lifting arm 108 may be attached to each rail 106 and may downwardly extend toward the container support floor 78 of the cargo compartment 28. Each lifting arm 108 may include a generally vertical upper end 110 and an inwardly angled lower end 112, similar to lifting arms 82 described above. The rail 106 may also include a linear actuating mechanism 114 mechanically connected to the upper end 110 of the lifting arm 108 to raise the lifting arm 108.

The upper end 112 of the lifting arms 108 may downwardly extend from the rail 106 past the upper section 66 of the side wall 56, 58, such that the lower end 86 is positioned generally parallel to the lower section 68 of the side walls 56, 58 in the preengaged position (FIG. 9A). The linear actuating mechanism 114 may lift the lifting arms 108 upwardly such that the lower ends 112 contact the lower sections 68 of the side walls 56, 58 of the container 34 in the engaged position (FIG. 9B). An inner surface of the lower end 112 of the lifting arms 108 may be flat to make suitably flush contact with the exterior surfaces of the side walls 56, 58 of the container 34. As the lifting arms 108 continue to move upwardly, the container 34 may be lifted off of the floor 78 in response to the upward force applied by the lifting arms 108 in the engaged and lifted position (FIG. 9C).

The linear actuating mechanism 114 may be any suitable linear actuating device in mechanical communication with the upper end 110 of the lifting arm 108. For example, the actuating mechanism 114 may be a screw jack, a scissor lift, a scissor jack, or a reel. The upper end 110 of the lifting arm 108 may include may include any suitably features corresponding with the mechanical connection with the actuator mechanism 114. The lift mechanisms 104 may be driven along the tracks 42, 44 between the front and rear ends of the cargo compartment 28 by a motor 116, including the area directly adjacent an opening of the cargo door 74.

As previously described, the crane assembly 36 may include orbital gears, a rack and pinion assembly, chains, belts, worm gears, or any other suitable linear drive train connected between the motor 116 and the lift mechanism 104 to move the rail 106 relative the track 42, 44. The motor 116 may be attached to the track 42, 44 and mechanically connected to the rail 106 of the lift mechanism 1048.

Alternatively, the motor 116 may be attached to the rail 106 and mechanically connected to the track 42, 44. The motor 116 may be any suitable electric, hydraulic, or pneumatic drive mechanism and may receive power from aircraft 12. The motor 116 may be electrically, hydraulically, or pneumatically connected to a suitable power supply within the aircraft 12. The motor 116 may also be operably connected to and power the actuating mechanism 114 of the lift mechanism 104. Alternatively, the actuating mechanism 114 may include its own independent linear drive mechanism and power supply.

Although various embodiments of the disclosed aircraft cargo compartment container crane system have been shown and described, modifications may occur to those skilled in the art upon reading the specification. The present application includes such modifications and is limited only by the scope of the claims.

What is claimed is:

1. An aircraft cargo compartment container crane system comprising:
    an aircraft comprising an upper passenger compartment and at least one lower cargo compartment, said cargo compartment being defined by a floor of said passenger compartment and a container support floor; and a crane assembly disposed entirely within said cargo compartment beneath said floor, said crane assembly being configured to lift a cargo container from said container support floor and move said cargo container within said cargo compartment along a longitudinal axis of said aircraft, said crane assembly comprising:
   at least one laterally opposed pair of lifting arms movable into engagement with opposed side walls of said cargo container, at least one lifting arm of said pair of lifting arms comprising an upper end extending downwardly into said cargo compartment and a lower end disposed at a non-zero angle relative to said upper end,
wherein said lower end engages a portion of at least one side wall.

2. The container crane system of claim 1 further comprising said cargo container, wherein:
   said at least one side wall of said cargo container comprises a vertical upper section and a lower section disposed at a non-zero angle relative to said upper section,
   said lower end of said at least one lifting arm engages said lower section of said at least one side wall, and
   said angle between said lower end and said upper end of said at least one lifting arm is substantially equal to said angle between said lower section and said upper section of said at least one side wall.

3. The container crane system of claim 2 wherein said cargo container is one of a unit load device, an LD3-45W container, an LD3-46W container, an LD6 container, an LD8 container, an LD3 container, an LD2 container and an LD1 container.

4. The container crane system of claim 1 wherein:
   said at least one side wall of said cargo container comprises a vertical upper section and a lower section disposed at a non-zero angle relative to said upper section, and
   said angle between said lower end and said upper end of said at least one lifting arm is substantially equal to said angle between said lower section and said upper section of said at least one side wall.

5. The container crane system of claim 1 wherein:
   each side wall of said opposed side walls comprises a vertical upper section and a lower section disposed at a non-zero angle relative to said upper section,
   each lifting arm of said pair of lifting arms comprises said upper end extending downwardly into said cargo compartment and said lower end disposed at said non-zero angle relative to said upper end,
   said lower end of said each lifting arm engages said lower section of said each side wall, and
   said angle between said lower end and said upper end of said each lifting arm is substantially equal to said angle between said lower section and said upper section of said each side wall.

6. The container crane system of claim 4 wherein said crane assembly comprises at least one lift mechanism configured to translate axially along said floor, and wherein said pair of lifting arms are operably connected to said lift mechanism.

7. The container crane system of claim 6, wherein:
   said lower end of said at least one lifting arm comprises a flat surface,
   said lower end of said at least one side wall comprises a flat surface, and
   said surface of said lower end makes flush contact with said surface of said lower section in response to engagement of said at least one lifting arm with said at least one side wall to capture said cargo container.

8. The container crane system of claim 7 wherein:
   said upper end of said at least one lifting arm comprises a flat surface,
   said upper section of said each side wall comprises a flat surface, and
   said surface of said upper end makes flush contact with said surface of said upper section in response to engagement of said at least one lifting arm with said at least one side wall.

9. The container crane system of claim 8 wherein:
   said container comprises a front wall and a rear wall opposite said front wall, and
   said at least one lifting arm extends from proximate said front wall to proximate said rear wall.

10. The container crane system of claim 8 wherein:
    said container comprises a front wall and a rear wall opposite said front wall, and
    said lower end of said at least one lifting arm extends from proximate said front wall to proximate said rear wall.

11. The container crane system of claim 1 wherein:
    said opposed side walls of said cargo container comprises:
       a first side wall; and
       a second side wall laterally opposed to said first side wall,
    each of said first side wall and said second side wall comprises an upper section and a lower section disposed as a non-zero angle relative to said upper section,
    said crane assembly further comprises:
       a plurality of first lifting arms movable into engagement with said first side wall of said cargo container; and
       a plurality of second lifting arms movable into engagement with said second side wall of said cargo container,
    said plurality of first lifting arms and said plurality of second arms are laterally opposed within said cargo compartment,
    each first lifting arm of said plurality of first lifting arms and each second lifting arm of said plurality of second lifting arms comprises said upper end extending downwardly into said cargo compartment and said lower end disposed at said non-zero angle relative to said upper end, and
    said angle between said lower end and said upper end is substantially equal to said angle between said lower section and said upper section.

12. The container crane system of claim 4 wherein said lift mechanism moves said at least one lifting arm linearly upward in a substantially vertical direction to engage said lower end with said lower section and lift said cargo container from said container support floor.

13. The container crane system of claim 4 wherein said lift mechanism rotates said at least one lifting arm inward to engage said lower end with said lower section and lift said cargo container from said container support floor.

14. The container crane system of claim 1 wherein said crane assembly is connected to a structural element of said floor, said crane assembly further comprising:
    a laterally opposed pair of tracks extending longitudinally along said floor in said cargo compartment; and
    a lift mechanism connected to each track of said pair of tracks, said lift mechanism being configured to translate linearly along said track,
    wherein said at least one lifting arm is operably connected to said lift mechanism.

15. The container crane system of claim 1 wherein said crane assembly further comprises:

a plurality of stanchions connected to said container support floor of said cargo compartment;

a laterally opposed pair of tracks connected to said plurality of stanchions, said pair of tracks extending along said longitudinal axis of said aircraft; and a lift mechanism connected to each track of said pair of tracks, said lift mechanism being configured to translate linearly along said track, wherein said at least one lifting arm is operably connected to said lift mechanism.

16. The container crane system of claim 15 wherein pair of tracks are structurally connected to said floor.

17. The container crane system of claim 1 further comprising load transfer assembly for laterally loading said cargo container onto said container support floor within said cargo compartment.

18. The container crane system of claim 17 wherein said load transfer assembly comprises at least one of a roller tray, a ball mat, a support surface with partially buried rollers, a support surface with a partially buried belt, a conveyor belt, and a low friction sliding surface.

19. The container crane system of claim 1 further comprising a securement device for preventing a sliding motion of said cargo container.

20. A method for loading a cargo container within an aircraft fuselage, said aircraft fuselage extending along a longitudinal axis and comprising a floor that defines a passenger compartment and a container support floor that defines a cargo compartment below said passenger compartment, said method comprising the steps of:

providing at least one cargo container at an initial position on said container support floor within said cargo compartment, said cargo container comprising a pair of opposed side walls, each side wall comprising a vertical upper section and a lower section disposed at a non-zero angle relative to said upper section;

providing a crane assembly disposed entirely within said cargo compartment, said crane assembly comprising at least one laterally opposed pair of lifting arms, each lifting arm comprising an upper end extending downwardly into said cargo compartment and a lower end disposed at a non-zero angle relative to said upper end, said angle of said lower end relative to said upper end is substantially equal to said angle of said lower section relative to said upper section;

positioning said pair of lifting arms such that said upper end is aligned with said upper section and said lower end is aligned with said lower section;

moving said pair of lifting arms to engage said lower section with said lower end and capture said cargo container between said pair of lifting arms;

lifting said cargo container from said container support floor with said lifting arms;

translating said lifted cargo container along said longitudinal axis to a storage location; and lowering said cargo container.

21. The method of claim 20 wherein:

said lower section of said each lifting arm comprises a flat surface, said lower section of said each side wall comprises a flat surface, and moving said pair of lifting arms to engage said lower section with said lower end and capture said cargo container between said pair of lifting arms comprises making flush contact between said surface of said lower end and said surface of said lower section.

22. The method of claim 21 wherein moving said pair of lifting arms to engage said lower section with said lower end and capture said cargo container between said pair of lifting arms comprises moving said pair of lifting arms upward in a generally vertical direction.

23. The method of claim 21 wherein lifting said cargo container from said container support floor with said lifting arms comprises moving said pair of lifting arms upward in a generally vertical direction.

24. The method of claim 21 wherein moving said pair of lifting arms to engage said lower section with said lower end and capture said cargo container between said pair of lifting arms comprises rotating said pair of lifting arms inward.

25. The method of claim 20 wherein lifting said cargo container from said container support floor with said lifting arms comprises rotating said pair of lifting arms inward.

* * * * *